March 11, 1941.　　　L. D. KROFF　　　2,234,867
POTATO SLICING MACHINE
Filed May 5, 1939　　　4 Sheets-Sheet 1

Inventor,
Leonard D. Kroff
By Cyrus Kehr & Sweeher
Attys.

March 11, 1941.　　　L. D. KROFF　　　2,234,867
POTATO SLICING MACHINE
Filed May 5, 1939　　　4 Sheets-Sheet 2

Inventor,
Leonard D. Kroff
By Cyrus Kehr & Sucher
Attys

March 11, 1941.　　　L. D. KROFF　　　2,234,867
POTATO SLICING MACHINE
Filed May 5, 1939　　　4 Sheets-Sheet 4
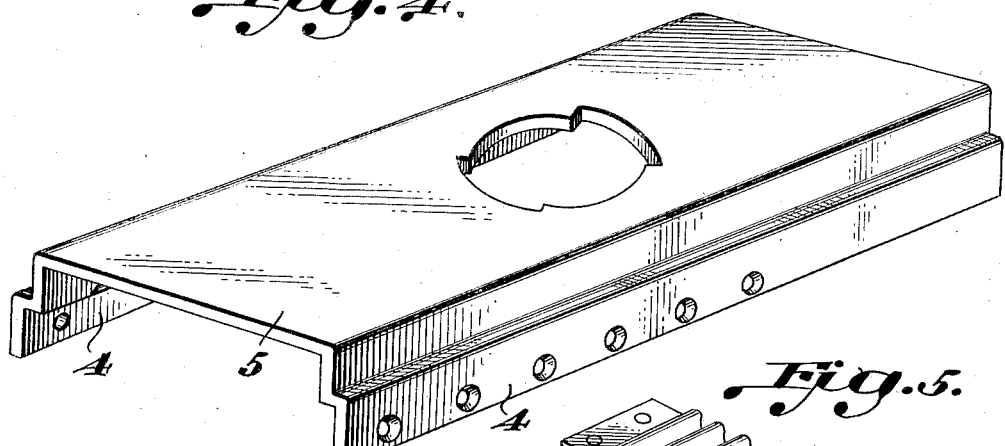
Fig. 4.
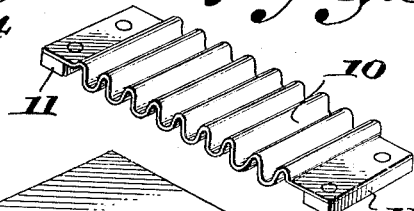
Fig. 5.
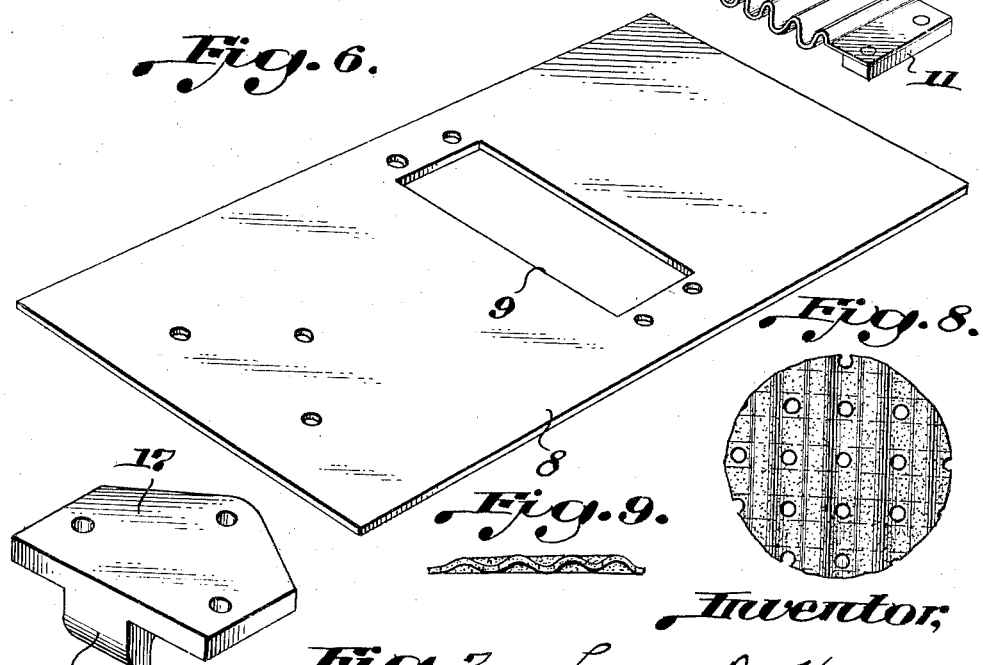
Fig. 6.
Fig. 8.
Fig. 9.
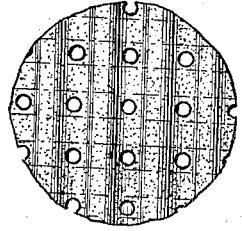
Fig. 7.
Inventor,
Leonard D. Kroff
By Cyrus Kehr & Smucker
Attys.

Patented Mar. 11, 1941

2,234,867

UNITED STATES PATENT OFFICE 2,234,867

POTATO SLICING MACHINE

Leonard D. Kroff, Sterling, Ill.

Application May 5, 1939, Serial No. 272,049

12 Claims. (Cl. 146—151)

This invention relates to the improvement in vegetable cutting machines, and more particularly to a machine for cutting potatoes into novel forms or slices resembling waffles or other designs of square or diamond mesh, or in shoe string shape.

The object of the invention is to simplify and improve the construction and manner of operation of a machine of this character which will enable it to make successive cuts of a potato or other vegetable, and to provide for imparting turning movement to the potato intermediate the successive cuts or strokes, which turning movement is accomplished automatically as a continuation of the cutting stroke so that the back stroke may be made immediately without any separate or independent action for the purpose of turning the potato about a vertical axis.

This object is accomplished by introducing the potato into a hopper where it feeds down to a cutting plate, the reciprocation of which carries a knife forwardly through the potato to sever a slice therefrom, and after this cutting movement is completed, a continuation of the stroke causes a bodily rotation of the hopper with the potato housed therein so as to turn it to an angle relative to its former position ready to receive a second cutting action. Then on the back stroke of the knife, a second cut is made, severing a slice from the potato by the respective forward and backward strokes. The shape of the cutting edge of the knife may be such as to impart a novel appearance to the slices to obtain a waffle shape, for instance, with the meshes square or diamond shaped, or these may be of other novel form, as desired.

In carrying out the object of this invention, I have shown a preferred embodiment thereof in the accompanying drawings, in which:

Fig. 4 is a perspective view of the supporting plate detached;

Fig. 5 is a perspective view of the knife detached;

Fig. 6 is a perspective view of the carriage plate detached;

Fig. 7 is a similar view of the carriage bracket;

Fig. 8 is a perspective view of a potato waffle formed by this machine; and

Fig. 9 is a side view of the potato waffle shown in Fig. 8.

Figure 1:
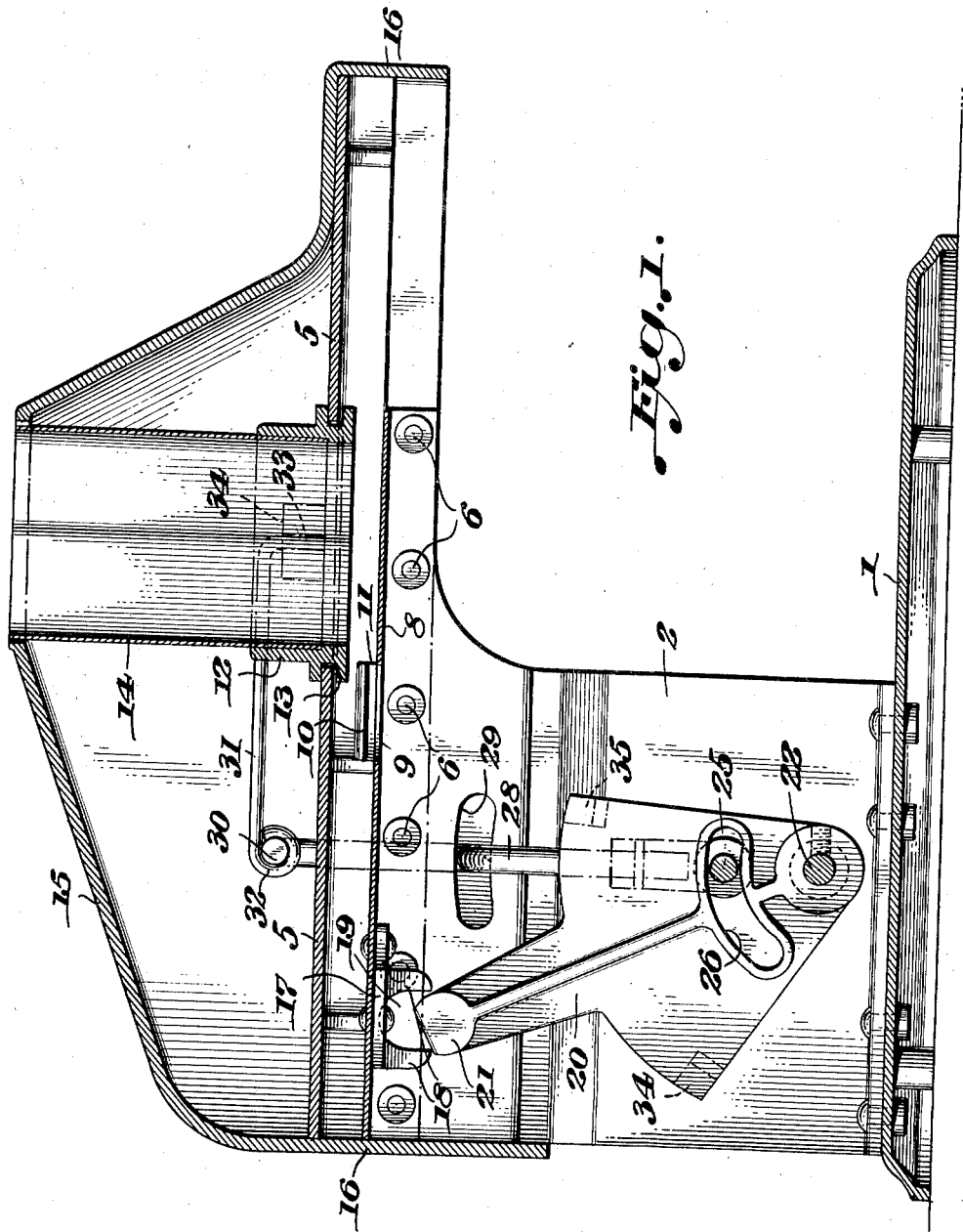
Fig. 1 is a vertical longitudinal sectional view through the machine.
Figure 3:
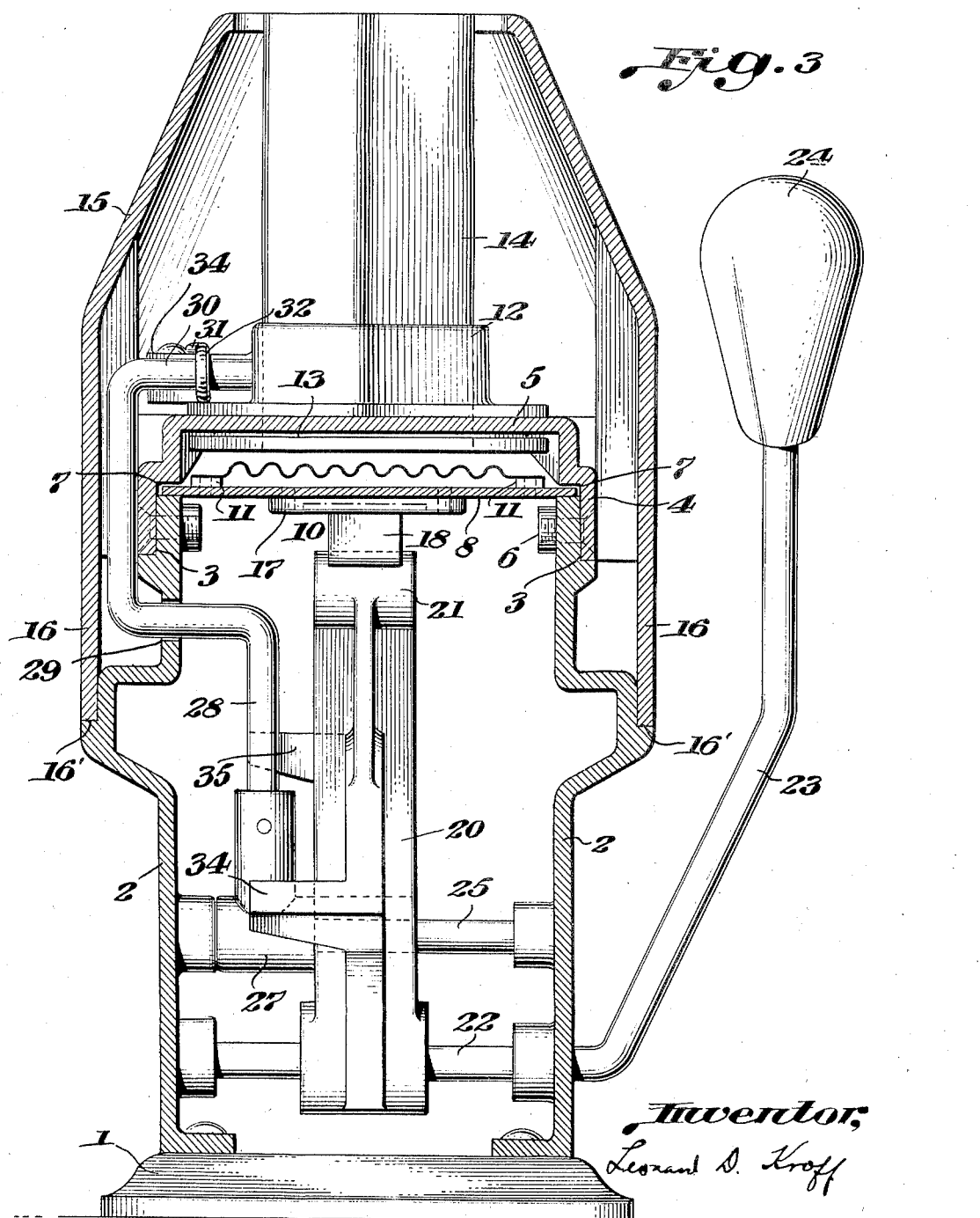
Fig. 3 is a vertical cross-section through the machine.

Referring to Figs. 1 and 3, the machine illustrated has a supporting base 1 carrying upstanding side plates 2 mounted thereon, and which side plates support the superstructure of the machine. At the upper edges of the side plates 2 are formed longitudinal shoulders 3 receiving downturned flanges 4 of a supporting plate 5, which is secured in place thereon by bolts 6 that extend through the upper edges of the side plates 2 and through the downturned flanges 4. The downturned flanges 4 are turned inward in overlapping relation with the upper edges of the sides 2 to provide guideways 7 therebetween.

Slidably mounted in the guideways 7 at its opposite edges is a carriage plate 8 which rests upon the upper edges of the side plates 2. The carriage plate 8 has a slot 9 therein as shown in Fig. 6, through which the slices may drop, and mounted above the slot 9 is a knife 10 carried by spacers or blocks 11, for instance (Fig. 5), to hold the knife 10 spaced above the upper surface of the carriage plate 8. The knife 10 has double cutting edges at both sides thereof, and it is preferably corrugated as shown in Figs. 3 and 5 with the corrugations extending parallel with the direction of movement of the knife, to obtain the novel waffle effect desired.

The supporting plate 5 has an opening therein receiving a casting 12 provided with a groove 13 to receive the edge of the opening in embracing relation, and the casting 12 is arranged in upstanding relation therefrom in the form of a sleeve. Mounted securely in the casting 12 is a hopper 14 that extends upwardly from the supporting plate 5 and is adapted to receive the potatoes to be sliced and to guide the same downwardly into the path of movement to the knife 10. In the form shown, the hopper 14 is illustrated as square to receive the potatoes that have been shaped accordingly for cutting slices therefrom of the novel shapes desired.

The upper portion of the machine is enclosed within a cover or housing 15 which surrounds the supporting plate 5, with a depending skirt 16 extending above the supporting plate and the upper edges of the side plates 2, which skirt is seated on shoulders 16' on flared portions of the side plates. It will be noted from Fig. 1 that the side plates 2 are located at one end of the base 1 leaving a space beneath the hopper 14 where the slices may drop onto the base or a receptacle placed thereon.

A bracket 17 is secured to the underside of the carriage plate 8 at one end thereof, which bracket 17 has spaced lugs 18 with an opening 19 between the said lugs. A segment 20 has a head 21 on the upper end thereof of semi-round shape to enter the space 19 between lugs 18 upon swinging movement of the segment 20, whereby to cause longitudinal sliding movement of the carriage plate 8. The segment 20 is carried by a shaft 22 to which it is fixed, which shaft 22 is journaled in the spaced side plates 2 and has one end turned upward to form a lever 23. A knob 24 is provided preferably on the upper end of the lever 23. Upon swinging movement of the lever 23, the segment 20 will be rocked back and forth to impart reciprocating movement to the carriage plate 8 and the knife 10.

Figure 2:
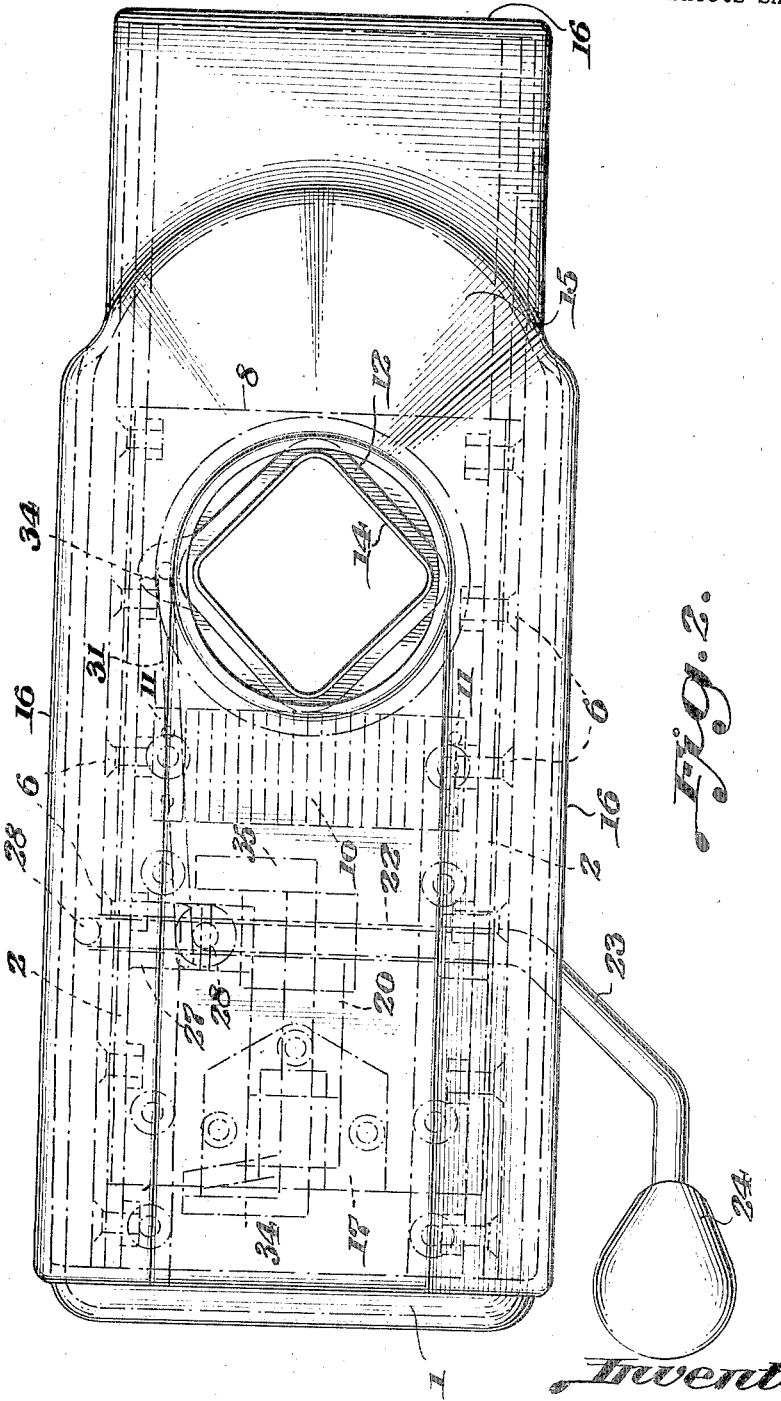
Fig. 2 is a top plan view thereof.

A shaft 25 is journaled between the side plates 2 and extends through an arcuate slot 26 in the segment 20. Fixed on the shaft 25 is a bushing 27 in the form of a T, one side of which carries an oscillatory arm 28. The arm 28 is turned laterally intermediate its ends through an arcuate slot 29 in one of the side plates 2, and then extends upwardly in overlapping relation above the supporting plate 5 where said arm 28 is provided with an inturned finger 30. A pitman 31 has an eye 32 at one end thereof journaled upon the finger 30 and extends therefrom to a point beside the sleeve 12, where said pitman 31 has a downturned end 33 engaging pivotally in a lug 34 extending laterally from one side of the sleeve 12, as shown in Figs. 1 and 2. The oscillatory arm 28 is actuated in different directions by lateral projections 34 and 35 on a side of the segment 20 which projections extend into the path of the arm 28 on opposite sides thereof.

In operation, the potatoes are shaped preferably to fit the angular or other shape of the hopper 14, which may be accompanied by a special knife or cutter for the purpose. Then one of the potatoes is fed into the hopper until its lower end rests upon the carriage plate 8. Forward swinging movement of the lever 23 from the position shown in Figs. 2 and 3 will cause rectilinear sliding movement of the carriage plate 8 by reason of the swinging movement of the segment 20 with its head 21 engaging in the opening 19 between lugs 18. This forward movement of the carriage plate 8 causes the knife 10 to be moved through the lower end of the potato, cutting a slice therefrom, which will thereby corrugate said lower end by reason of the corrugated shape of the knife.

When the lever 23 has been moved forward sufficiently to complete the slice, the head 21 of the segment 20 passes out of engagement with the lugs 18, and at the same time, the projection 34 has been moved forward into engagement with the oscillatory arm 28 in its initial position at the left hand end of the slot 29 in Fig. 1. The lever 23 may be moved forward to a further extent without creating sliding movement of the plate 8, and during such extended movement the swinging motion of the segment 20 will be imparted by the projection 34 to the oscillatory arm 28 to swing said arm from its position at the left hand end of the slot 29 in Fig. 1 to the right hand end of said slot. This moves the pitman 31 to the right and imparts a turning movement to the sleeve 12 and the hopper 14 relative to the supporting plate 5, which causes rotation of the potato through an arc of 90° from its initial position, where it is ready to receive a second cut.

Upon swinging movement of the lever 23 in its opposite direction, the head 21 will first engage the lugs and then will cause movement of the carriage plate 8 to the left in Fig. 1, which will cause the knife 10 to be forced through the potato again, removing another slice therefrom, which later will have corrugated upper and lower surfaces, substantially as shown in Fig. 8, but the corrugations extend at angles to each other. This slice will drop through the slot 9 in the carriage plate 8 onto the base 1 or a receptacle placed thereon for the purpose. When the lever 23 has been moved to the left sufficiently to complete the back stroke of the knife 10, substantially in the position shown in Fig. 1, the projection 35 engages the arm 28 as the head 21 moves out of its engagement with the lugs 18, to cause turning movement of the hopper 14 to its initial position ready for a second slicing operation.

These forward and backward slicing motions may be continued until the desired number of slices are obtained or the potato has been completely sliced up.

By changing the effective stroke of the pitman 31, as by providing lost motion connection thereof, the degree of turning movement of the hopper 14 may be varied as desired, so as to provide the corrugated cuts at 90°, 45°, or other angular positions relative to each other. By changing the shape of the knife 10, other shapes may be provided than the corrugated cuts herein described.

I claim:

1. A vegetable cutter comprising a supporting plate, a sleeve journaled in the plate, a hopper secured to the sleeve and upstanding therefrom, turning means operatively connected with the sleeve, a knife, a carriage plate supporting the knife and mounted beneath the hopper, and means for reciprocating the carriage plate and having operative lost-motion connection with the hopper turning means that is constructed to be inoperative during the cutting stroke and to actuate said hopper turning means only at the end of the cutting stroke.

2. A vegetable cutter comprising a support adapted to hold a vegetable in position for slicing, means for turning said support, a knife, means mounting said knife for slicing movement relative to the support, a yoke having separated lugs and connected with said knife, and a segment having a head in position to enter the space between the lugs for moving the knife in a cutting stroke in one direction and movable out of said space at the completion of said cutting stroke, said segment having an operative connection with the turning means after completion of the cutting stroke.

3. A vegetable cutter comprising a support adapted to hold a vegetable in position for slicing, a knife, means mounting said knife for slicing movement relative to the support, means including separated lugs connected with said knife, a segment having a head in position to enter the space between the lugs for moving the knife, said segment being mounted for movement of the head out of the space between the lugs at the completion of the slicing motion, and means for turning the vegetable support and actuated after movement out of engagement with the lugs.

4. A vegetable cutter comprising a support adapted to hold a vegetable in position for slicing, a knife mounted for sliding movement relative to the support to apply a slicing action to the vegetable, a bracket connected with the knife and having spaced lugs, a segment having a head adapted to engage between the lugs for actuating the knife, means mounting said segment for swinging movement into and out of engagement with the lugs for actuating the knife, and means for turning the vegetable support and actuated by the segment after movement out of engagement with the lugs.

5. A vegetable cutter comprising a support adapted to hold a vegetable in position for slicing, a knife mounted for sliding movement relative to the support to apply a slicing action to the vegetable, a bracket connected with the knife and having spaced lugs, a segment having a head adapted to engage between the lugs for actuating the knife, means mounting said segment for swinging movement into and out of engagement with the lugs for actuating the knife, means for turning the vegetable bodily, and means for actuating said turning means by the segment after movement out of engagement with the lugs.

6. A vegetable cutter comprising a structure having guideways therein, a carriage plate slidably mounted in the guideways, said carriage plate having a knife mounted thereon, a bracket fixed to the carriage plate and having downturned lugs spaced apart, a segment having a head in position to engage between the lugs for actuating the carriage plate and knife, means mounting said segment for swinging movement, and a lever connected with said mounting means for actuating the segment.

7. A vegetable cutter comprising a base having upstanding side plates mounted thereon, said side plates having opposed guideways, a carriage plate slidably mounted in the guideways, a knife mounted on the carriage plate and spaced therefrom, a bracket secured to the underside of the carriage plate and having downturned spaced lugs, a segment having an upwardly projecting head disposed between the lugs in position for actuating the carriage plate and knife, a shaft journaled in the side plates and having the segment secured thereon, and a lever fixed to the shaft for actuating the same.

8. A vegetable cutter comprising a base, upstanding side plates mounted on the base, said side plates having opposed guideways therein, a supporting plate mounted on the side plates in bridging relation therebetween, a hopper carried by the supporting plate, a carriage plate slidably mounted in the guideyways beneath the hopper, a knife mounted on the carriage plate in spaced relation therefrom, said carriage plate having a bracket secured to the underside thereof with depending spaced lugs, a segment having an upstanding head engaging between the lugs for actuating the carriage plate and knife, a shaft mounting said segment between the side plates, and a lever fixed to said shaft for actuating the same.

9. A vegetable cutter comprising a base, upstanding side plates mounted on the base, said side plates having opposed guideways therein, a supporting plate mounted on the side plates in bridging relation therebetween, a hopper carried by the supporting plate, a carriage plate slidably mounted in the guideways beneath the hopper, a knife mounted on the carriage plate in spaced relation therefrom, said carriage plate having a bracket secured to the underside thereof with depending spaced lugs, a segment having an upstanding head engaging between the lugs for actuating the carriage plate and knife, a shaft mounting said segment between the side plates, and a lever fixed to said shaft for actuating the same, means mounting said hopper in the supporting plate for bodily turning movement relative thereto, an oscillatory arm operatively connected with said hopper for turning the same, and means connected with the segment for actuating said arm at the completion of the slicing action.

10. A vegetable cutter comprising a base, upstanding side plates mounted on the base, said side plates having opposed guideways therein, a supporting plate mounted on the side plates in bridging relation therebetween, a hopper carried by the supporting plate, a carriage plate slidably mounted in the guideways beneath the hopper, a knife mounted on the carriage plate in spaced relation therefrom, said carriage plate having a bracket secured to the underside thereof with depending spaced lugs, a segment having an upstanding head engaging between the lugs for actuating the carriage plate and knife, a shaft mounting said segment between the side plates, and a lever fixed to said shaft for actuating the same, means mounting said hopper for bodily turning movement relative to the supporting plate about a vertical axis, an oscillatory arm operatively connected with the hopper for turning the same, means mounting said arm for swinging movement, and projections carried by the segment on opposite sides of the oscillatory arm in positions for engaging the arm to move the same at the completion of the slicing actions, and cause turning movement of the hopper.

11. A vegetable cutter comprising a support for a vegetable to hold the same in position for slicing, a knife, means mounting said knife for movement relative to the support, spaced projections connected with said knife, a segment in position to engage between the projections for actuating the knife, means mounting the segment for swinging movement into and out of engagement between the projections, means for turning the vegetable bodily relative to the knife, a means for actuating said turning means by the segment after disengagement thereof from between the projections at the completion of the slicing action.

12. A vegetable cutter comprising a support for holding a vegetable in position for slicing, a corrugated knife having opposite cutting edges, means mounting said knife for sliding movement alternately in opposite directions relative to the support, said knife having spaced projections connected therewith, a segment having a head in position to engage between the projections for actuating the knife in opposite directions, means mounting said segment for swinging movement into and out of engagement between the projections in the respective opposite directions of movement of the knife, means mounting said vegetable support for bodily turning movement about an upright axis relative to the knife, and means for causing turning movement of the support by the segment when the head thereof is disengaged from the projections at the completion of the slicing movements in opposite directions.

LEONARD D. KROFF.